July 13, 1926.  1,592,390

M. STALEY

ELECTRIC CONTROLLER

Filed April 16, 1923  6 Sheets-Sheet 1

INVENTOR
Marcellus Staley
BY
ATTORNEY

M. STALEY

ELECTRIC CONTROLLER

Filed April 16, 1923 6 Sheets-Sheet 4

INVENTOR
Marcellus Staley
BY
ATTORNEY

July 13, 1926.

M. STALEY

ELECTRIC CONTROLLER

Filed April 16, 1923   6 Sheets-Sheet 6

INVENTOR
Marcellus Staley
BY
N. F. Bissing
ATTORNEY

Patented July 13, 1926.

1,592,390

UNITED STATES PATENT OFFICE.

MARCELLUS STALEY, OF BROOKLYN, NEW YORK.

ELECTRIC CONTROLLER.

Application filed April 16, 1923. Serial No. 632,206.

This invention relates to improvements in remote controllers for electric elevators and the like. In an electric elevator, the operator has under manual control, a control switch which can occupy three different positions. These three positions produce three results, the rise, the stoppage and the descent of the elevator, by starting, stopping and reversing an electric motor. When the control switch occupies one of the three positions it automatically puts into motion the necessary controlling mechanism for producing these results.

One of the objects of this invention is to construct a control panel of the least number of parts, easily repaired, accessible and rugged, yet providing under automatic action all the requirements for protection to the motor against abuse on the part of the operator, or inductive discharges on the part of the motor.

Another object is to reduce the number of working switch parts; after the reversing switch is thrown at either terminal of travel, the car is started to the next floor by the closing of a single line switch, without operating the reversing switch. Moreover, there being two of these line switches connected in parallel, the duty on each of them is one half the duty on the line closing switch as usually employed, thus giving long life to the bearings, coils and circuit opening contacts. All troublesome contacts usually employed to give protective features in the car switch and starter circuits are done away with, there being only one dynamic contact opened and three contacts made and broken to start and stop and reverse the motor, this being accomplished by the action of a single lever. The motor is automatically protected against sudden reversal of current through the armature thus enabling the operator to throw his switch from full speed in one direction to full speed in the reverse direction without injury to the motor or parts of the controller.

The motor and controller are automatically protected against destructive discharges by continuously maintaining a closed shunt field circuit.

Another object of the invention is to mechanically and electrically interlock both line switches so that only one can be closed at a time the other at that time being kept open.

With the above and other objects in view, my invention consists in the parts, improvements and combinations more fully pointed out hereinafter.

Referring now to the accompanying drawings illustrating one form of the invention.

Figures 1, 13:
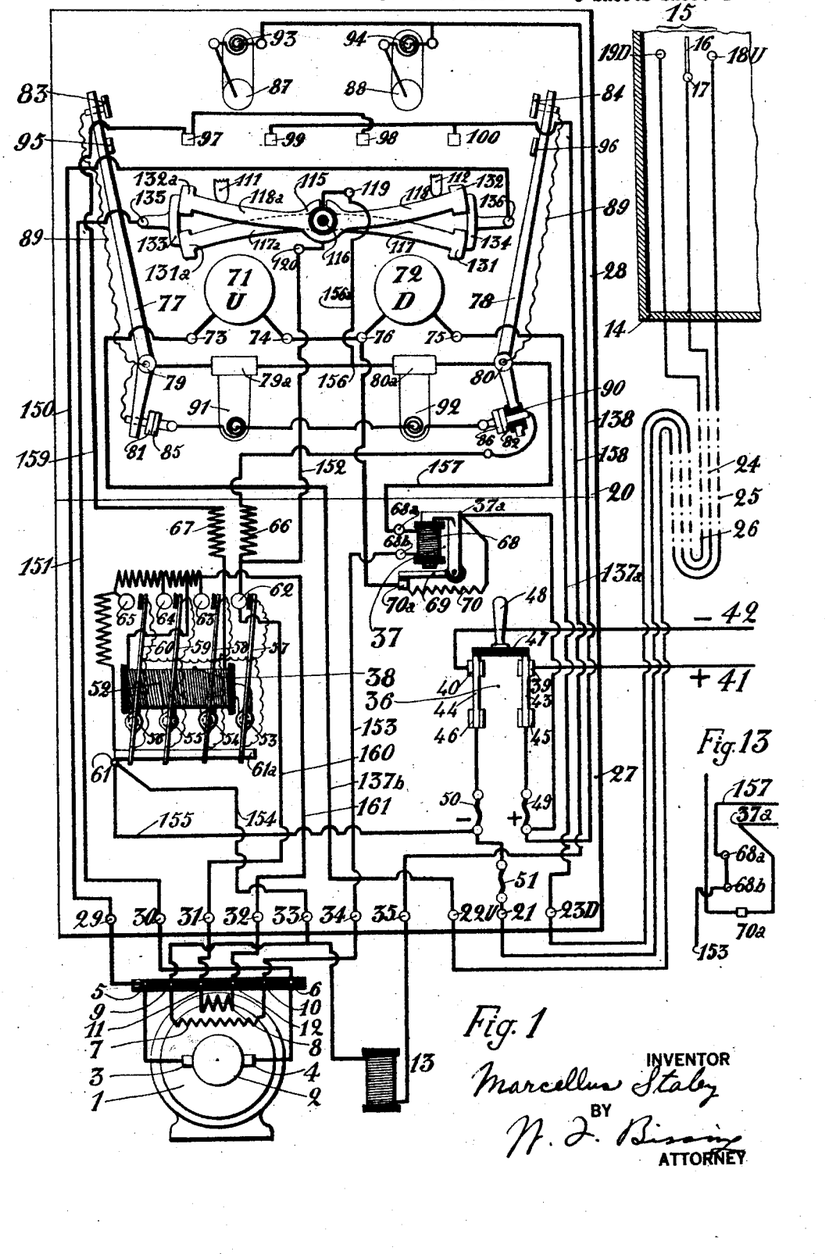
Fig. 1, represents diagrammatically the different parts of the controlling mechanism mounted upon a board and showing the circuit connections.
Fig. 13, is a modification doing away with the shunt relay magnet, which has been found to be unnecessary.
Figure 2:
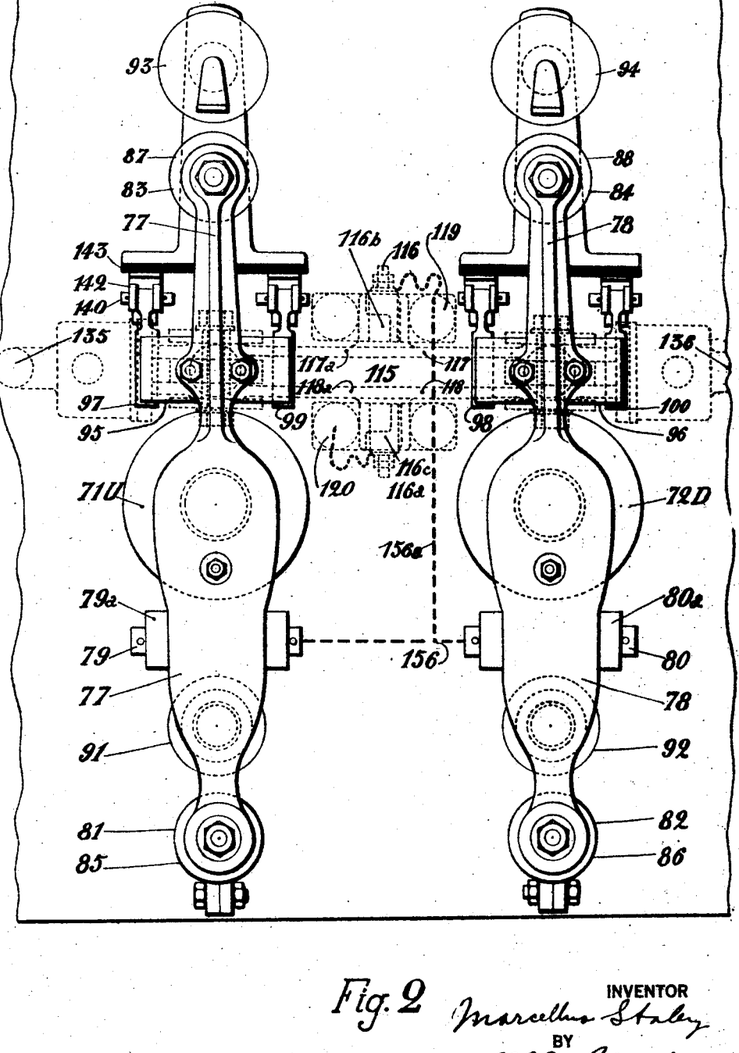
Fig. 2, is a front view of a part of the mechanism occupying the upper portion of Fig. 1, illustrating particularly the up and down magnets and associated parts.
Figure 3:
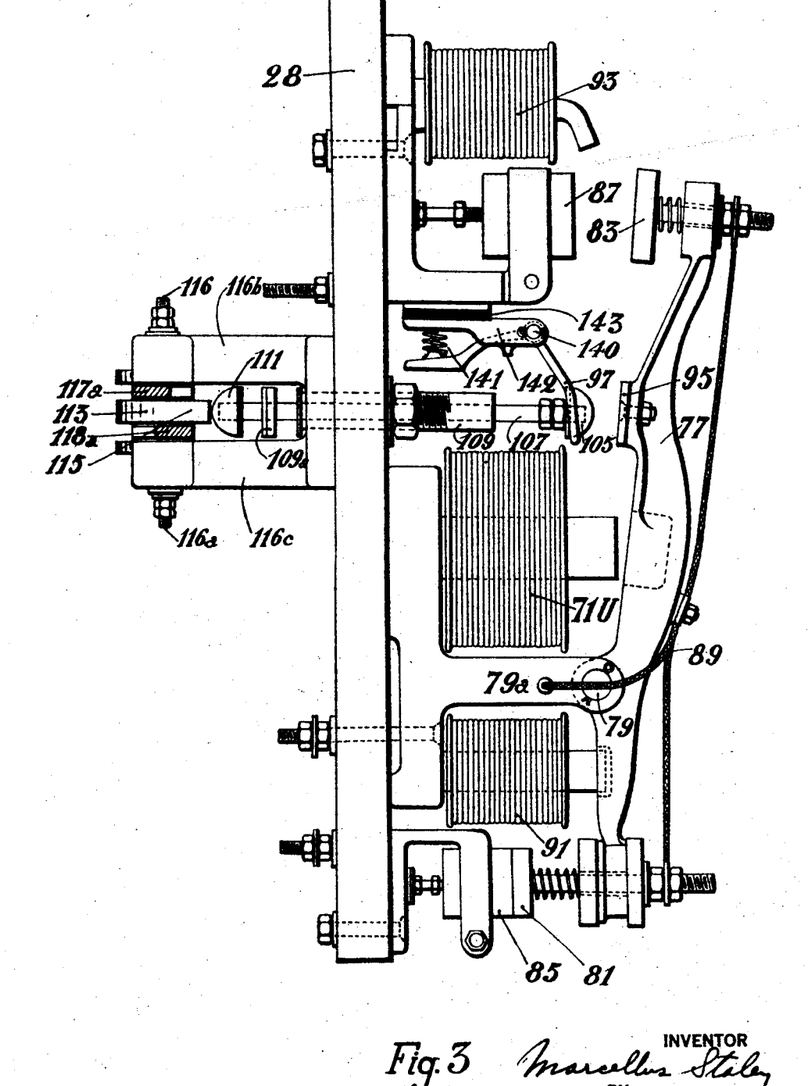
Fig. 3, is a side elevation of the mechanism shown in Figure 2.

In Figure 1, the electric motor which drives the elevator car is diagrammatically illustrated at 1, the commutator 2 of the motor and brushes 3, 4, being connected to the terminals 5 and 6, as illustrated. The motor is indicated as provided with a shunt and series field, the former being illustrated at 7, connected to terminals 9 and 10. The series field 8 of the motor is connected to the terminals 11 and 12. The terminals 5, 6, 9, 10, 11 and 12 are connected to the parts on the panel or board as illustrated in Figure 1 and as will be more particularly described hereafter. The car of the elevator is indicated in part at 14 at the upper right hand portion of Figure 1, the car containing the two-direction switch 15, indicated diagrammatically, having the movable member 16 pivoted at 17 and the two fixed contacts 18—U (up) and 19—D (down), which must be closed by the movable member in order to produce the rise or descent of the car.

The mechanism which controls these motions of the car is mounted upon the panel 20, which provides a distribution point for the wiring between the car and motor. To effect this the pivot 17 and the contacts 18 and 19 are connected to three terminals 21, 22—U (up) and 23—D (down) on the panel by means of insulated cables 24, 25, 26, which may be of any desired length so as to permit the necessary movement of the car 14.

It is to be understood that between the car and the motor other connections both mechanical and electrical are provided in addition to those illustrated on the panel as, for example, mechanical driving mechanism for raising the car when the motor turns in one direction and for lowering the car when the motor turns in the other direction; braking mechanism, electric limit switches which limit the extreme movement of the car and stop the current thru the motor when the limits are reached at the top and bottom of the shaft; and other devices. As these parts form no part of the invention they are not illustrated.

The panel 20 of Figure 1 is composed of two parts, the lower part 27 and the upper portion 28; these are formed of insulating material such as slate. On the lower portion 27 some mechanisms are grouped and illustrated which in themselves form no part of the invention excepting as they enter into combination with the other parts. The more important features of the invention are arranged and illustrated on the upper part 28 of the panel, these parts being again illustrated in detail in Figures 2 to 5.

Terminals 29, 30, 31, 32, 33, 34, 35 and 21, 22, 23, are mounted on the panel and as illustrated on the lower part. They serve to connect the controller, the motor and the car; the main line switch 36, the relay magnet 37 for the shunt circuit of the motor and the starting rheostat 38, including the series field resistance of the motor.

The main line switch 36 connects with two metal blades 39 and 40 connected by mains 41 and 42 to the power or lighting circuit of the town, which supplies the current for driving the elevator, furnishing current to the parts illustrated in Figure 1. The two metallic jaws 43 and 44 of the switch are pivoted at 45 and 46 and are connected by insulating bar 47 carrying a handle 48, thus enabling the circuit to be opened or closed at its two poles. Fuses 49 and 50 protect against short circuits in the panel wiring and a fuse 51 protects against short circuit between the car and terminal 21.

The starting rheostat 38 consists essentially of a wire coil or magnet 52 which can magnetize the four poles 56, 55, 54 and 53 and thus successively attract the four levers 60, 59, 58 and 57, the levers being conductive or provided with conducting wires and electrically connected together. These levers are pivoted on and communicate with the conducting bar 61, 61ª. When the magnetized poles attract their levers, the levers enter into contact with the contact buttons 65, 64, 63 and 62. These buttons are connected to the resistances of the starting rheostat and to the series field of the motor and connect or disconnect or shortcircuit these resistances, so that in starting the motor, all are first in series with the motor armature and are then successively cut-out.

A shunt relay magnet may be employed with the shunt field for inserting resistances in series with the up or down magnet or for cutting it out. This consists of a magnet coil 68 which attracts the pivoted lever 69 or lets it drop, depending on whether the current thru the magnet is made or broken. And, depending upon its position the current is obliged to pass thru the resistance 70 (of about 250 ohms for example), or this resistance is short-circuited and the current passes thru the soft iron yoke, pivoted armature 69 and contact 70ª, on its way to the up or down magnet coil, thus protecting these magnets and also protecting the motor against reversal on the part of the operator. The shunt relay magnet 37 and resistance 70 may, however, be omitted, the dynamic holding down coils for the line closing switches performing this protective function satisfactorily, and the magnets 72, 71 may be wound with higher resistance to take full line voltage thus simplifying the mechanism, see Fig. 13. In this construction magnet 68 and its armature are omitted, wire 153 connects directly with wire 157 and direct connection is made from terminal 37ª to 70ª, resistance 70 being omitted.

Coming now to the description of the parts mounted on the upper part of the panel, which are illustrated diagrammatically in Figure 1 and more in detail in Figures 2 to 6, there are provided first, two up and down magnets 71—U and 72—D, being so designated because the magnet 71—U is energized by way of its terminals 73, 74 when the operator throws the switch to cause the car to go up; whereas when the car is caused to go down, the current passes thru the magnet 72—D, by way of its terminals 75, 76.

According as the current traverses or does not traverse one of these magnets, the corresponding line closing switch lever 77 or 78 is thereby attracted or remains in place, these levers being pivoted respectively at 79 and 80. In the form illustrated they are metallic and carry at their lower parts contacting plates or buttons of copper 81, 82, preferably yieldingly mounted thereon. They carry, at their upper ends two other yieldingly mounted copper contacts 83 and 84. The yielding mounting of these contacts brings about close contact of the surfaces with the fixed contacts 85, 86, 87 and 88 respectively and a quick return of the levers. The contacts carried by the levers are adjusted in position by means of screw bolts passing thru the ends of the levers, the bolts carrying the contacts at their ends.

Since the pivots 79 and 80 and the mounting of the contacts 81, 82, 83, 84 might at times introduce a poor connection into the circuit, copper ribbons 89 (see Fig. 3) are provided connecting the respective contacts at the ends of each lever, with the frames 79ᵃ and 80ᵃ, respectively.

Below the magnet 71—U and 72—D are placed two other dynamic magnets 91 and 92 which when excited attract the levers 77 and 78 in the opposite sense from that of the up and down magnets and hold the levers in the opposite position corresponding to the stoppage of the motor. These magnets are placed in the dynamic braking circuit of the system.

Two other magnets 93 and 94 are placed on top of the panel above the contacts 83, 87 and 84, 88. The poles of these magnets are arranged to produce a magnetic field so as to blow out, i. e., break the arc made on breaking circuit between contacts 83 and 87 or 84 and 88 when these contacts separate.

It is to be understood and as shown in detail views that the pivots 79 and 80 of the levers 77 and 78 are horizontal and parallel to the plane of the panel and that the levers move in vertical planes normal to the panel, these planes passing thru the poles of the magnets associated with the corresponding lever. In the diagram in Figure 1, the levers have been illustrated disposed to the right and left, so as to make the diagram more readily understandable.

The levers 77 and 78 play two parts, the one electrical the other mechanical. One of the electrical functions consists in forming contact with and in putting into electrical connection two contact plates 97 and 99 by means of the plate 95; the two other plates 98 and 100 being electrically connected at the proper time by plate 96. These contacts are made when the corresponding lever is attracted by its up or down magnet.

Each contact plate, as for example 97, is pivoted upon a pivot 140 and pressed away from the panel by means of spring 141. The pivot and spring are carried by a support 142 mounted upon an insulating block 143 so that two contact plates corresponding to the plate carried by the cooperating levers are only put into electrical connection by the plate on the lever when the lever strikes them. By means of the lever and contacts the brake magnet 13 is controlled, as well as the starting rheostat, the lever also making the shunt, series field and armature circuits as will be explained.

The mechanical function of the levers 77, 78 and plates 95 and 96 carried thereby, is to move at the proper time a reversing switch 115 with its interlock which forms one of the important features of the invention. The reversing switch reverses the current thru the motor armature. Disconnectible mechanical, loose connections are provided between the line switches and the reversing switch. After the reversing switch is thrown into position, the car is started to the next floor by merely operating the line switch, the reversing switch remaining in position without being operated. To produce this result, when one of the levers 77 or 78 is attracted toward the panel, the corresponding plate 95 or 96 strikes an insulated button 105 (or 106) see Figures 3, 4, the button being carried by rod 107 (or 108) which passes thru the panel being supported and guided by tube 109 or (110). A stop 109ᵃ (or 110ᵃ) limits the movement of the rod. The rod moves another button 111 (or 112) see Figures 1, 3, 4, 5, which moves a fibre washer 113 (or 114) made of insulating material, thus moving the reversing switch and parts connected therewith.

The reversing switch 115 may oscillate on its axis 116 when one of the levers, 78 for example, is attracted towards the panel. The switch 115 will then pass from one extreme position thru the middle or intermediate position shown in Figure 1 in order to take the position shown in Figure 4. In doing so it moves button 111 and button 105 is thus brought to bear against plate 95 and lever 77, so that the two levers 77 and 78 can never approach the panel together. When a magnet 72—D for example attracts its lever 78, this movement keeps the opposite lever 77 in its place.

The reversing switch 115 consists of two metallic members, each member consisting of two arms numbered 117ᵃ and 117, and 118 and 118ᵃ. The arms 117, 117ᵃ form one member, and the arms 118, 118ᵃ form the other member. The members are placed one above the other, and are insulated from each other and have circuit closing ends, which may be curved.

The upper member 117, 117ᵃ, is pivoted on the shaft 116 carried by the standard 116ᵇ provided with terminal 119, whereas the lower member 118, 118ª, is pivoted on the shaft 116ª carried by standard 116ᶜ, provided with a terminal 120. The two members move together, being secured together by bolts 121 and 122, the bolts being insulated from the members by insulating sleeves 123 and 124 and by insulating washers 113, 114, 127, 128, 129 and 130 (see Figure 5). The ends of the reversing switch in the form illustrated are provided with curved circuit-closing brush surfaces 131 and 131ª for member 117, 117ª, and the member 118, 118ª carries corresponding surfaces 132 and 132ª. The length of the surfaces 131, 131ª, 132, 132ª is sufficient to place them in engagement with the respective pairs of contacts 133 and 134. The surfaces ensure non-interruption of the circuits.

In the extreme positions of the switch (at one of which positions the switch is always standing when the controller is in service), only one of the four arms of the switch is in contact with the terminal 135 and the opposite arm of the other half of the switch is in contact with the terminal 136. Accordingly, when the magnet 72—D has attracted the corresponding lever, the reversing switch will occupy the position shown in Figures 4 and 5 and there will be electrical communication from terminal 120 to terminal 136 and from terminal 119 to terminal 135. If, however, magnet 71—U is energized and attracts its lever, then the electric current will flow from terminal 120 to terminal 135 and from terminal 119 to terminal 136.

Two contacts 133 are provided for single contact 135 and in the same way two contacts 134 are utilized for terminal 136. The wires from the contacts run to a single terminal at each side. Terminals 119 and 120 are connected by wires to the two halves of the reversing switch 115. The contacts insure non-interruption of current despite the movement of the switch. In the diagram Figure 1 the reversing switch is shown in elevation instead of at right-angles to the panel as in the remaining figures, this being so illustrated for clearness. The different parts which have been described are connected in circuits by wires shown in Figure 1.

In accordance with the invention, as has been noted above, means are provided whereby the lever 78 (or 77 as the case may be) will control the making of the shunt field circuit of the motor, the making of the starting rheostat resistance circuit which is in series with the series field of the motor and the making of the brake magnet circuit. The lever 78 (or 77) likewise makes the power circuit thru the motor. Moreover, the lever 78 (or 77) will mechanically determine the position of the reversing switch and, therefore, the direction of the current thru the motor armature, this mechanism at the same time preventing one of the up or down magnets from attracting its lever if the other has acted.

The circuits and parts for energizing the up or down magnet will first be described and then the circuits for completing the shunt field, the starting rheostat and the brake magnet after which will follow the description of the motor armature circuit and finally the circuits for preventing disruptive discharge of the shunt field and for dynamic braking of the armature.

Let us suppose that the car is at rest and that the operator wishes to lower it. He moves the arm 16 of the car-controlling switch into contact with the fixed contact 19—D, current will then flow thru the down magnet 72—D, as follows; (see Figures 1 and 6): from positive main 41, switch point 39, jaw 43, pivot 45 to fuse 49 of the main switch; the wire leading from the fuse 49 to terminal 37ª of the shunt relay magnet 37, (if used) whose armature 69, at this moment is resting against contact 70ª, resistance 70 being short-circuited, the current arrives with its full strength at the terminal 76, thence passing to the down magnet 72—D and terminal 75. It continues by wire 137ª, terminal 23—D, cable 26 and reaches contact 19—D, where the operator has closed the circuit by means of the switch arm 16, having thrown it to the left, and the current then passes thru point 17, wire 24, terminal 21, fuses 51 and 50, pivot 46, jaw 44 and blade 40 of the switch 36, to the negative main 42.

The lever 78 in connection with the circuits provided, when attracted and approaching the panel performs a number of functions.

Figure 7:
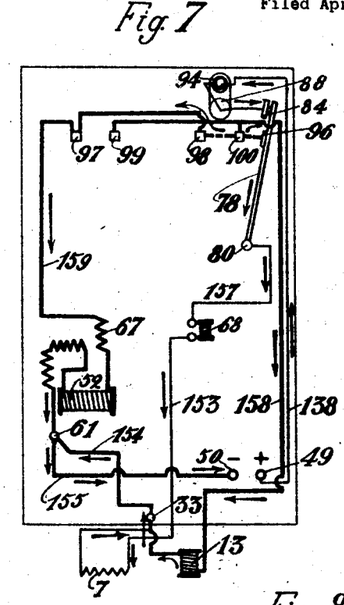
Fig. 7, is a diagram illustrating the three circuits made when the down magnet is energized, thru the brake magnet, the shunt field and the starting rheostat magnet.

One function: The shunt field of the motor is excited. Contact is made between the contacts 88 and 84 and the upper end of lever 78 so that current can pass from the positive terminal at 49 by wire 138, blow out magnet 94, contacts 88 and 84, lever 78, its pivot 80, wire 157, magnet 68, wire 153, terminals 34 and 10, shunt field 7, terminals 9 and 33, wires 154 and 155 back to the negative terminal at 50 (see Figure 7).

This current also excites magnet 68 (if used), which raises its armature 69 and breaks circuit at 70ª, thus compelling the current which is passing thru magnet 72—D to pass thru the resistance 70. The current is thus weakened thru magnet 72—D saving current and keeping the magnet cool during the time that the car continues to descend. But I have found that this relay may be dispensed with (see Figure 13).

Figure 4:
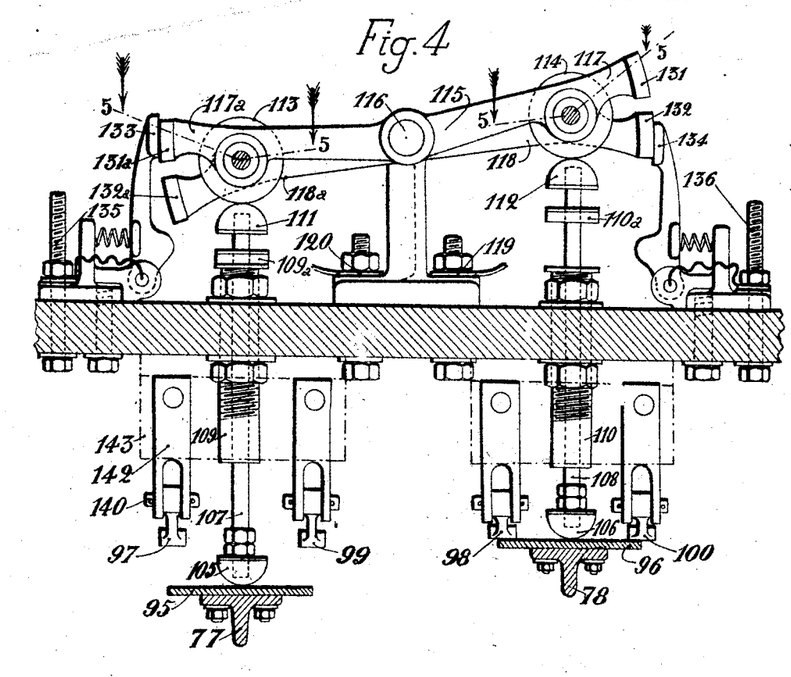
Fig. 4, is a plan view, partly in section, looking down on the top of the board shown in Figure 1 and illustrating the reversing switch and the interlocking mechanism when the car is descending.
Figure 5:
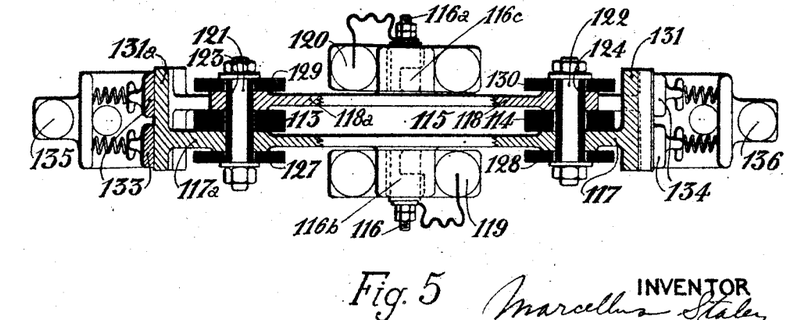
Fig. 5, is a section on line 5—5 of Figure 4.
Figure 6:
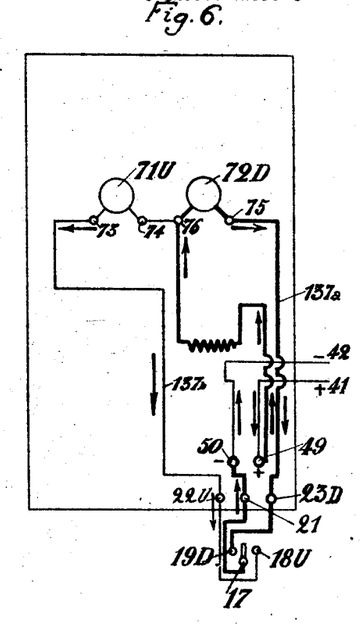
Fig. 6, is a diagram illustrating the circuits of the up and down magnets.
Figure 8:
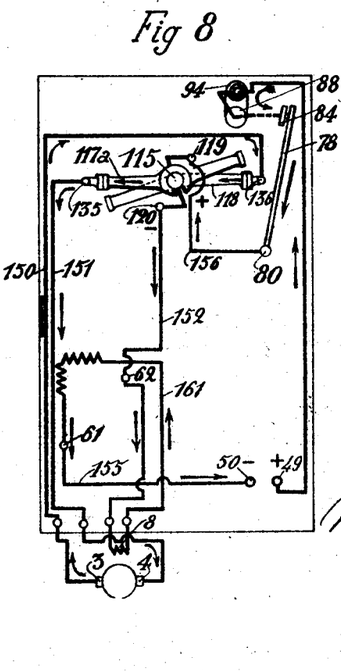
Fig. 8, is a diagram illustrating the operating circuit thru the motor armature.
Figure 9:
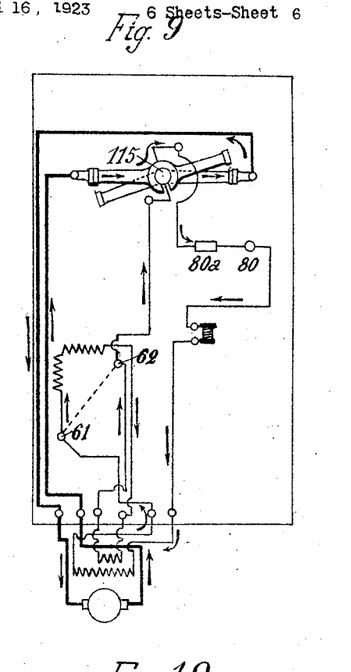
Fig. 9, is a diagram illustrating the shunt field discharge circuit.

Another function performed by the movement of the lever 78 towards the panel is to push the button 112 and to place the reversing switch into the position shown in Figure 4. This permits sending the current thru the armature and the starting rheostat (see Figure 8). A part of the line current, just referred to, which enters at 88, 84 and has reached pivot 80 by means of lever 78, passes thru the junction 156, wire 156ª, terminal 119, arm 117ª, contact 131ª, contacts 133, terminal 135, wire 151, terminals 30 and 6 and brush 4, where it enters into the motor armature leaving it by brush 3 after having traversed the armature in a direction which determines its direction of rotation. The mechanical gearing and connections between the armature and the car are so arranged that the motor will turn in the direction, under these conditions, so that the car descends.

From brush 3 the current passes to the terminals 5 and 29, to wire 150 and terminal 136 to contacts 134 to the contact 132 and the arm 118 of the reversing switch, then to the terminal 120 and from this terminal by wire 152 to contact 62 of the starting rheostat. From contact 62, the current passes by wire 160 to terminal 31 and thru the series field resistance of the motor, then returns by terminal 32 and wire 161 thru the rheostat resistances in series back by way of terminal 61 and wire 155 to the negative pole at 50.

The starting rheostat coil having been energized (for energizing circuit see below), rheostat levers 60, 59, 58, 57, are attracted by pole pieces 56, 55, 54, 53 and successively cut out the several series resistances of the rheostat and the series field, until all are cut out whereupon the armature current entering at 62 passes by way of the rheostat levers and their pivot and leaves at 61 and home to 50 without passing thru the series field and the series resistances.

The energizing of the starting rheostat coil occurs as follows: If for example it is the lever 78 which has been attracted, its contact 96 which first pushed button 112, finishes its travel in entering into contact with the two contacts 98 and 100 (see Figures 1 and 7). From 98 current passes thru wire 159, resistance 67, rheostat magnet 52, terminal 61 and home to 50.

Figure 11:
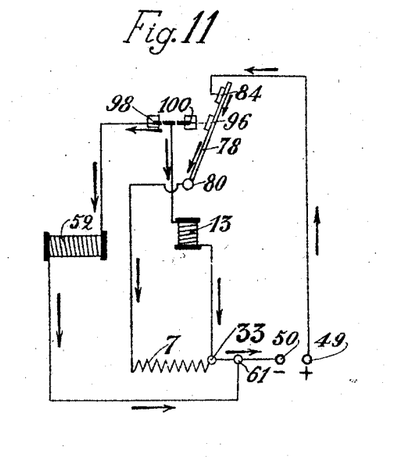
Fig. 11, is a diagram illustrating the circuits of Fig. 7, simplified.

It will thus be observed that the main current from positive terminal 49 and wire 138 then passes thru magnet 94, contacts 88, 84 and along lever 78. Here it divides into three portions (see Figures 1, 7 and 11). One portion as previously explained completes the shunt field circuit by way of lever 78, pivot 80, wire 157, 153, shunt field 7, terminals 33, 61 and home to negative main 50. Another portion passes thru the brake magnet 13 by way of lever 78, contacts 96, 100, wire 158, brake magnet 13, terminals 33, 61 and home at 50. In passing thru magnet 13, the current releases the brake and keeps this released so as to permit the motor to turn. The third portion energizes the starting rheostat magnet by way of 96, 98, 97, wire 159, resistance 67, rheostat magnet 52, terminal 61 and home to 50.

If instead of lever 78, lever 77 has been attracted the circuits just mentioned will be established in the same manner, the only difference being that they pass thru contact 99, plate 95 and contact 97, (instead of 100, 86, 98) and similar results are produced.

Before examining the other results produced by the movement of the movable member 16 of the car switch, we may rapidly trace the circuit to show what happens when the movable member 16 is moved toward the right so as to close contact 18—U to send the car up. The current will then pass, starting from the positive main 41 to main switch contact 39, blade 43, pivot 45, fuse 49, then by wire to terminal 37ª, armature 69, terminal 70ª, then to junction 76, then to 74 and up magnet 71—U, terminal 73, wire 137ᵇ, terminal 22—U, wire 25, fixed contact 18—U at the car switch, switch member 16, pivot 17, wire 24, terminal 21, fuse 51, fuse 50, thru switch arm 44 and back to the negative main 42. By means of this circuit the up magnet 71—U is energized and the lever 77 is attracted toward the panel. From this movement of the lever the result would be to bring into contact, contacts 83 and 87 and to send the current by the pivots 79 and 80 of the levers thru the shunt circuit of the motor. The armature 69 of the magnet 68 (if used) will then rise, and the weakened current passing thru resistance 70 before reaching magnet 71—U will keep the magnet cool during the rise of the car just as the other magnet was kept cool when the car was descending. The reversing switch has also been moved in the reverse direction and the current passing thru it will enter the motor by brush 3 and leave it by brush 4, thus reversing the direction of rotation of the motor and raising the car instead of lowering it. In fact, the current reaching the reversing switch thru terminal 119 will find the switch pushed by button 111, in the opposite position to that given it by button 112. The current will pass from terminal 119 by way of 117, 131, 134, 136, 150, 29, 5, 3 and 4 (instead of 4 and 3) 6, 30, 151, 135, 133, 132ª, 118ª and terminal 120. As in the preceding case the current will pass from the terminal 120 thru the motor starter returning by wire 155 to the negative pole at 50. The reversing switch and the motor are thus traversed, when the car rises, by current flowing in the opposite direction from that of the current when the car descends. The motor is thus turned in the opposite direction and the car rises. The starter is, however, always traversed in the same direction, which insures its proper action.

Having thus described the construction and operation when starting the motor normally, certain features of the invention will now be described which protect against the injurious effects of inductive discharge of the shunt field and which prevent too sudden a reversal of current thru the armature and too sudden a reversal of the movement of the car.

*Shunt field discharge circuit.*—When the motor stops i. e. when the car stops by opening circuit of magnet 72—D (or 71—U) by car switch 15 at 19—D or 18—U, the shunt field circuit is cut from the line by lever 78 falling back and opening the line circuit at 84, 85. But a shunt field circuit still remains thru the motor armature, and a second path is almost immediately, thereafter, made thru the dynamic resistance. A discharge circuit is thus provided for the current due to self-induction still flowing in the shunt field. This will flow from shunt field 7, terminal 9, 33, wire 154, 61, thru the short-circuit arms of rheostat to terminal 62 (for these rheostat arms were closed while the motor and car were moving and have not had time to open), or if open thru the starting resistance, wire 152 and the corresponding arm of reversing switch, out thru contact 134, or 133 as the case may be, thru the motor armature and the other arm of the reversing switch to shaft 116 wire 156ª, junction 156, pivot 80, wire 157, coil 68 of magnet 37 (if used) and terminal 34 back to the shunt field. It should be noted that in the middle position of the reversing switch, the four cylindrical surfaces at its ends are in contact with panel contacts 133 and 134, which are wide enough to span both surfaces. The current, therefore, does not break in the reversing switch while it is changing position, so that the reversing switch always provides a path for inductive discharge thus relieving the motor of insulation stresses and avoids rupturing the field insulation.

Moreover, this discharge thru coil 68 holds armature 69 up and resistance at 70 (250 ohms) is in series with magnet 72—D (or 71—U). This weakens the current in 72—D (or 71—U) and prevents said magnets from attracting their respective levers. This prevents closing the circuit to the motor from the line, and protects the motor against sudden reversal by the operator throwing the car switch until the field discharge has become zero—and consequently has become zero in magnet coil 68. The operator going in one direction is thus unable to quickly reverse the current thru the armature of the motor. After zero current in coil 68—armature 69 drops and resistance 70 (250 ohms) is cut out. So when magnet 72—D (or 71—U) is to be reenergized full current can flow thru either of them making them strong enough to pull their levers. But as long as the shunt field is excited by the discharge current, the shunt relay magnet being in series with the field, the current in 72—D (or 71—U) is weakened with the result stated above.

Figure 12:
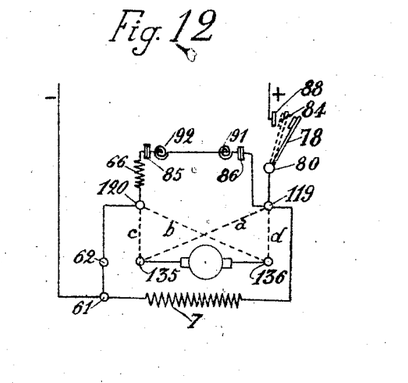
Fig. 12, is a diagram illustrating the circuits of Figs. 9 and 10, simplified.

*Dynamic brake magnet circuit.*—The dynamic brake circuit of the motor is established by permitting the levers 78 or 77 to fall back, when de-energizing magnets 72 or 71. The circuit will then be formed by contacts 82, 86 or 81, 85. The armature of the motor will furnish current instead of absorbing it and the current so produced will pass by way of brush 3, terminals 5 and 29, wire 150, terminal 136, contacts 134, 131, arm 117, terminal 119, wire 156ª, junction 156, thru the pivots 79ª, 79 of the levers, contacts 81, 85, magnets 91 and 92, contacts 86, 82, respectively, resistance 66, terminal 120, arm 118ª, contact 132ª, 133, terminal 135, wire 151, terminals 30 and 6 and brush 4. The armature will thus be quickly brought to rest, depending on the amount of resistance at 66. Both dynamic brake magnets 91 and 92, it will be noted are in circuit, viz, in series across the armature of the motor. When one magnet is energized by the current from the motor when stopping, the other is also energized. Both magnets will thus attract the lower ends of the levers 77 and 78 and keep contacts 81, 85 and 82, 86 firmly closed, so that it is not necessary to depend on a spring or weight for this purpose. The dynamic brake circuit, by holding levers 77 and 78 open, will likewise prevent the line magnets 71 and 72 from attracting their levers until the current in the dynamic circuit has died down and the armature come to rest. This adds greatly to the simplicity and economy and does away with the shunt field magnet 68 and all its parts. By referring to Figures 1 and 12 it will be observed that on breaking the line circuit at 84 for example, the shunt field discharge circuit will nevertheless remain thru the reversing switch and motor armature, the two paths of the discharge current thru the two positions of the reversing switch being indicated at $c\ d$ and $a\ b$, respectively, in Fig. 12. Discharge current flows for example from a shunt terminal to 119ª,—135—motor armature—136—$b$—120 back to the shunt field.

Again the dynamic circuit thru non-inductive resistance 66 is made a moment later after the break at 84 and after lever 78 has moved completely back so as to close contact 86. Contact 85 was already closed. This gives another discharge circuit for the shunt field and the motor armature thru the dynamic non-inductive resistance 66 so as to quickly discharge the shunt field and also quickly bring the motor armature to rest.

Assuming that the operator has stopped his motor and wants to start his motor again immediately in the same direction, too sudden a start is automatically prevented by the respective dynamic coil holding the corresponding up or down lever. For example suppose the car switch has been thrown to the down contact and that magnet 72 and the controller are causing the car to descend and the motor to turn correspondingly. The car may then be stopped by the operator and he may endeavor again to quickly start the car downward. Dynamic magnet 92 prevents this for it holds lever 78 away from magnet 72 and even though magnet 72 were again energized by the operator having thrown the car switch to the down position, arm 78 will not respond for magnet 92 holds it out until the current in 92, produced by the dying down rotation of the armature, has decreased to substantially zero. By this time the motor rheostat 38 has reset its controlling levers to starting position for the motor, thus throwing the protecting rheostat resistances in series with the armature of the motor. After this has happened, arm 78, responds to magnet 72 (the car switch being presumed to have remained on its down contact) and the line current is supplied to the motor without danger of injury. Moreover, by preventing too sudden a start and acceleration of the motor and car, the inertia of the mechanism, the strain on the cables and other resistances are overcome gradually, the gradual starting of the car being secured by the action of the controlling mechanism as has just been described.

When reversing the current thru the armature of the motor so as to change the direction of travel of the car, the advantages due to my controller mechanism are still more pronounced. The operator may quickly and freely reverse his car switch without injury to the motor or the control and without jarring or injuring the apparatus, the car or its passengers, the device being automatically self-protective.

Figure 10:
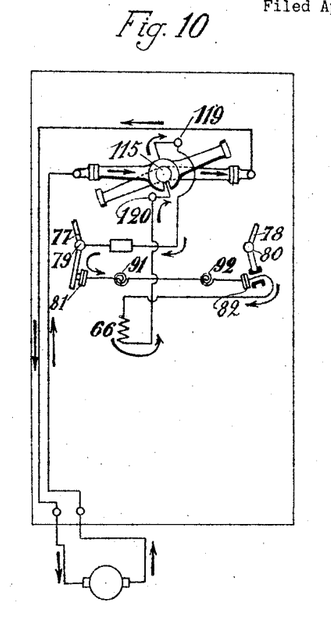
Fig. 10, is a diagram illustrating the dynamic brake circuit.

Consider the case where the car switch is on the down contact in the car and magnet 72 has been energized, etc., so that the car is moving at full speed downward. Suppose the operator now suddenly reverses the current from full speed down to full speed up, making contact on button 18—U. The following action takes place: The moment contact 19—D is broken (by the operator throwing the car switch from 19—D to 18—U) current thru magnet 72 is broken and lever 78 flies back quickly due to gravity and the springs back of contacts 84, 98 and 100. This first breaks the circuit at 84, 88. The lower end of lever 78 then makes contact thru 82, 86 closing the circuit thru dynamic magnets 92, 91 (see Figures 1 and 10). Lever 77 was and is already back and away from the magnet 71 (for magnet 71 is de-energized) so that contacts 81, 85 have been made (by gravity). The current now flowing thru dynamic magnets 92 and 91, these magnets pull on the lower ends of arms 78 and 77, thus firmly closing the contacts 81, 85 and 82, 86 and holding the levers 78, 77 with their upper ends away from the panel. The circuit may be traced as follows (see Figures 1 and 10). When the car switch reaches the contact 18—U, thus energizing up-coil 71, this coil is not of sufficient strength to attract the lever 77 against the pull of the dynamic magnet 91. The air gap between the pole of magnet 71—U and the lever has been increased due to the pull of magnet 91 compressing the spring for contact 81, thus diminishing the effective pull of 71. It is not until the current thru magnet 91 has died down, due to the decreasing speed of rotation of the armature, that the magnet 91 is sufficiently weakened to permit up-magnet 71 to attract the lever 77. This attraction pushes reversing switch 115 so as to reverse the current thru the motor armature and make line contact at 83, 87: This reverses the motor. Between the time that contacts 84, 88 open and contacts 83, 87 have been made as described, sufficient interval of time has elapsed to permit the starting rheostat to reset to starting position and the brake magnet 13 to function and the brake to be released. Thus the operator is able to move his controlling switch quickly from one contact to the other to reverse the car going at full speed in one direction, so that it may go at full speed in the other direction, without excessive strain on the apparatus and without reversing the full current upon the motor armature.

Having thus described the invention it will be understood that changes may be made therein without departing from the principle of the invention.

What I claim and desire to secure by Letters Patent is:

1. In a motor controller for starting, stopping and reversing a motor at a distance, the combination of a pair of line magnets, of two line switch levers, each lever controlled by one line magnet only, a motor and its armature circuit, a shunt field circuit for the motor, one terminal of the field being permanently connected to each of said switch levers, and a reversing switch for the armature circuit separate from said switch levers, disconnectible connections between said switch levers and said reversing switch, whereby either of said line switch levers may actuate said reversing switch, said line switch levers interrupting the line current without breaking the connection thru the reversing switch between the armature and shunt field circuits.

2. In a motor controller for starting, stopping and reversing a motor at a distance, the combination of a pair of line magnets, and a pair of line switches, each switch controlled by one line magnet only, a motor and its armature circuit, a shunt field circuit for the motor, a reversing switch for the motor armature, mechanical, loose connections between said reversing switch and each of said line switches, said line switches being movable independently of the reversing switch, to close and open the line circuit, and means whereby said line switches interrupt the line current without breaking the connection between the armature and shunt field circuits.

3. In a motor controller for starting, stopping and reversing a motor at a distance, the combination of a pair of line magnets, and a pair of line switches, each switch controlled by one line magnet only, a motor and its armature circuit, a shunt field circuit and, a starting rheostat magnet for the motor, said shunt field and rheostat magnet having each one terminal continuously connected to the line, the other terminal being closed by each of the line switches, a reversing switch for the armature circuit, and disconnectible connections between said reversing switch and said line switches for actuating the reversing switch, said line switches being thereby movable independently of the reversing switch, to close and open the line circuit.

4. In an elevator motor controller for starting, stopping and reversing an elevator motor at a distance, the combination of a pair of line magnets, a car control switch and circuits for controlling said line magnets, a pair of line switches controlled by the line magnets, one line switch for each line magnet, a motor and its armature circuit, a shunt field circuit for the motor, a reversing switch for the armature circuit, and disconnectible connections between said reversing switch and said line switches, said line switches interrupting the line current without actuating the reversing switch, thus preserving the connection between the armature, the reversing switch and shunt field discharge circuits.

5. In a motor controller the combination of an up magnet, a down magnet, and circuits controlling said magnets, a pair of line closing switch levers each one controlled by one line magnet only, a motor armature, circuit connections for said motor armature, and a reversing switch separate from the line switch levers and actuated by both of said levers to reverse the current thru the motor armature.

6. In a motor controller the combination of an up magnet, a down magnet, a switch and circuits controlling said magnets, a pair of levers each lever controlled by one magnet only, said levers serving as line switches, a motor armature, circuit connections for said motor armature including a pair of terminals, and a reversing switch separate from said line switch levers consisting of two members adapted to make and break connection with said terminals, said switch being actuated by said levers to reverse the current thru the motor.

7. In a motor controller the combination of an up magnet, a down magnet, a switch and circuits controlling said magnets, a pair of levers each lever controlled by one magnet only, said levers serving as line switches, a motor armature, circuit connections for said motor armature, including a pair of terminals, and a pivoted reversing switch consisting of two members insulated from each other, each member consisting of a pair of arms, bolts insulated from and passing thru said arms for securing the members together, said arms adapted to make and break connection with said terminals, said switch being actuated by said levers to reverse the current thru the motor.

8. In an elevator controller the combination of an up magnet, a down magnet, a pair of levers one for each magnet said levers acting as line switches, a pair of rods one for each lever, a reversing switch separate from the line switch levers and actuated by said rods, a motor armature and circuit connections between the reversing switch and the motor armature.

9. In an elevator controller the combination of an up magnet, a down magnet, a pair of pivoted levers, one for each magnet, serving as line switches, said magnets and levers being mounted on one side of a panel, a pair of rods, one for each lever, said rods passing thru said panel, a pivoted reversing switch mounted on the other side of said panel, said switch actuated by said rods, a motor armature and circuit connections between the motor armature and reversing switch.

10. In an elevator controller, the combination of an up magnet, a down magnet, a pair of levers, one for each magnet, a yieldingly mounted, adjustable bolt carried by the end of each lever, a line-closing contact carried by the bolt, a pair of rods, one for each lever, a reversing switch actuated by said rods, a motor armature and circuit connections between the reversing switch and the motor armature.

11. In an elevator controller, the combination of an up magnet, a down magnet, a lever for each magnet, said levers acting as line switches, a motor armature, a reversing switch separate from said line levers and circuit connections between said switch and motor armature, and a dynamic brake circuit for said motor, said dynamic brake circuit passing thru said reversing switch and being controlled by said levers.

12. In an elevator controller the combination of an up magnet, a down magnet, a car switch and circuit connections for said magnets, a lever for each magnet, said levers acting as line switches, a motor armature, a reversing switch separate from said levers and circuit connections between said switch and motor and a dynamic brake circuit for said motor armature, controlled by said levers, said dynamic brake circuit including in series with the armature a pair of magnets one for each lever, said dynamic brake circuit magnets being normally disconnected from the motor armature and when energized serving to attract and hold said levers.

13. In an elevator controller, the combination of an up magnet, a down magnet, a car switch and circuit connections for said magnets, a pair of levers each pivoted intermediate its ends, a line contact carried by one end of each lever, a motor armature, a reversing switch separate from said levers and circuit connections between said switch and motor armature, a dynamic brake circuit for said motor, said dynamic brake circuit including said reversing switch, and a contact carried by the other end of each lever for closing the dynamic brake circuit.

14. In an elevator controller the combination of an up magnet, a down magnet, a car switch and circuits for said magnets, a pair of line closing switch levers one controlled by each magnet, a motor, a reversing switch separate from the line switch levers, disconnectible connections between the reversing switch and the levers for actuating it, and means whereby each of said levers upon breaking the line circuits makes a dynamic brake circuit and upon disconnection from the reversing switch for the armature of the motor, said dynamic brake circuit including said reversing switch and a pair of line switch lever coils, said coils being normally disconnected from the motor armature.

15. In an elevator controller the combination of an up magnet, a down magnet, a pair of line closing switches, one controlled by each magnet, a motor, an armature therefor, a reversing switch separate from the line closing switches for reversing the current thru the motor armature, disconnectible connections between the reversing switch and the line switches for actuating it when the line switch is closed and for leaving it in actuated position when the line switch is opened, a shunt field for the motor one end of said field being attached to a line terminal and the other end to the line closing switches, and connections between the terminals of said shunt field and said reversing switch thereby permitting the shunt field discharge to take place thru said reversing switch when the line switch is opened.

16. In an elevator controller the combination of an up magnet, a down magnet, a line closing switch controlled by each magnet, a motor and its armature, a reversing switch separate from the line switches, disconnectible connections between the reversing switch and the line switches for actuating it, a shunt field for the motor, one end of said field being attached to a line terminal and the other end to a line closing switch, connections between the terminals of said shunt field and said reversing switch thereby permitting the shunt field discharge to take place thru said reversing switch when the line switch is opened, a dynamic brake circuit, and means whereby said line switches upon breaking the line circuits make a dynamic brake circuit for the armature of the motor, said brake circuit being also arranged to receive the shunt field discharge.

17. In an elevator controller, the combination of an up magnet, a down magnet, a car switch and circuits for said magnets, a pair of line switches, one controlled by each magnet, a motor and its armature, a reversing switch separate from the line switches, disconnectible connections between the reversing switch and the line switches for actuating it, a shunt field for the motor, and a circuit thru the reversing switch for receiving the shunt field discharge, said reversing switch being constructed to continuously preserve the shunt field discharge circuit, irrespective of the position of the reversing switch.

In testimony whereof, I have signed my name to this specification.

MARCELLUS STALEY.